US010257785B2

(12) United States Patent
Kim et al.

(10) Patent No.: US 10,257,785 B2
(45) Date of Patent: Apr. 9, 2019

(54) DEVICE AND METHOD FOR CONTROLLING STANDBY POWER OF MOBILE TERMINAL

(71) Applicant: Samsung Electronics Co., Ltd., Suwon-si, Gyeonggi-do (KR)

(72) Inventors: Rak-ie Kim, Suwon-Si (KR); Kyoung-Soo Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/531,716

(22) PCT Filed: Nov. 25, 2015

(86) PCT No.: PCT/KR2015/012724
§ 371 (c)(1),
(2) Date: May 30, 2017

(87) PCT Pub. No.: WO2016/085255
PCT Pub. Date: Jun. 2, 2016

(65) Prior Publication Data
US 2017/0347320 A1    Nov. 30, 2017

(30) Foreign Application Priority Data
Nov. 28, 2014    (KR) .......................... 10-2014-0168845

(51) Int. Cl.
*H04B 1/16*    (2006.01)
*H04W 52/02*    (2009.01)

(52) U.S. Cl.
CPC ... *H04W 52/0261* (2013.01); *H04W 52/0258* (2013.01); *H04W 52/0264* (2013.01);
(Continued)

(58) Field of Classification Search
CPC ......... H04W 52/0261; H04W 52/0258; H04W 52/0264
(Continued)

(56) References Cited

U.S. PATENT DOCUMENTS

| 7,650,522 B2* | 1/2010 | Linsley-Hood ..... H04W 40/248 713/321 |
| 8,271,054 B2 | 9/2012 | Bockus et al. |

(Continued)

FOREIGN PATENT DOCUMENTS

| KR | 20120118093 A | 10/2012 |
| KR | 20140051717 A | 5/2014 |

(Continued)

*Primary Examiner* — Sonny Trinh

(57) ABSTRACT

Disclosed are: a communication technique combining, with IoT technology, a 5G communication system for supporting a data transmission rate higher than that of a 4G system, and subsequent systems; and a system therefor. The disclosed communication technique and system therefor can be applied to intelligent services (for example, services related to a smart home, a smart building, a smart city, a smart car or a connected car, health care, digital education, retail business, security, safety and the like) on the basis of 5G communication technology and IoT-related technology. A method for controlling standby power of a mobile terminal, of the present invention, comprises: detecting applications and services related to a background operation; classifying the detected applications and services according to characteristics; predicting use patterns for the applications and the services classified by the characteristics, in consideration of a user response to the applications and the services classified according to the characteristics; and controlling the applications and the services classified by the characteristics, on the basis of the applications and the services classified by the characteristics and the predicted use patterns.

18 Claims, 6 Drawing Sheets

(52) U.S. Cl.
CPC ......... *H04W 52/0216* (2013.01); *Y02D 70/00* (2018.01); *Y02D 70/126* (2018.01); *Y02D 70/20* (2018.01)

(58) Field of Classification Search
USPC ..................... 455/574, 343.1, 343.2, 127.5
See application file for complete search history.

(56) References Cited

U.S. PATENT DOCUMENTS

| | | | |
|---|---|---|---|
| 9,125,159 B2* | 9/2015 | Lee | .................... H04W 52/0258 |
| 2012/0015693 A1 | 1/2012 | Choi et al. | |
| 2012/0052817 A1 | 3/2012 | Lee et al. | |
| 2012/0326724 A1 | 12/2012 | Park | |
| 2014/0245042 A1 | 8/2014 | Frid | |
| 2015/0143340 A1* | 5/2015 | Shin | .................... G06F 11/3013 |
| | | | 717/124 |

FOREIGN PATENT DOCUMENTS

| | | |
|---|---|---|
| WO | 2012008628 A1 | 1/2012 |
| WO | 2012030001 A1 | 3/2012 |
| WO | 2012093795 A2 | 7/2012 |
| WO | 2013137556 A1 | 9/2013 |

* cited by examiner

DEVICE AND METHOD FOR CONTROLLING STANDBY POWER OF MOBILE TERMINAL

CROSS-REFERENCE TO RELATED APPLICATIONS

The present application claims priority under 35 U.S.C. § 365 to International Patent Application No. PCT/KR2015/012724 filed on Nov. 25, 2015, entitled "DEVICE AND METHOD FOR CONTROLLING STANDBY POWER OF MOBILE TERMINAL", and, to Korean Patent Application No.10-2014-0168845 filed on Nov. 28, 2014, each of which is incorporated herein by reference into the present disclosure as if fully set forth herein.

TECHNICAL FIELD

The present invention relates to a device and a method for controlling standby power of a mobile terminal.

BACKGROUND

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a Beyond-4G-network communication system" or "Post-Long-Term Evolution (LTE) system".

To achieve a high data transmission rate, implementing a 5G communication system in an extremely high frequency (mmWave) band (for example, a 60 GHz band) is being considered. To relieve the path loss of signals and to increase the transmission distance of signals in an extremely high frequency band, beamforming, massive Multiple-Input And Multiple-Output (massive MIMO), Full Dimensional MIMO (FD-MIMO), array antenna, analog beamforming, and large-scale antenna techniques are under discussion for a 5G communication system.

Further, to improve the network of the system, technical development in an evolved small cell, an advanced small cell, a cloud Radio Access Network (cloud RAN), an ultra-dense network, Device-to-Device (D2D) communication, wireless backhaul, a moving network, cooperative communication, Coordinated Multi-Points (CoMP), and interference cancellation is progressing for the 5G communication system.

In addition, an Advanced Coding Modulation (ACM) scheme including Hybrid Frequency Shift Keying (FSK) and Quadrature Amplitude Modulation (FQAM) and Sliding Window Superposition Coding (SWSC) and an advanced access technique including Filter Bank Multi Carrier (FBMC), Non-Orthogonal Multiple Access (NOMA), and Sparse Code Multiple Access (SCMA) are being developed in the 5G system.

Meanwhile, the Internet is evolving from a human-centered network, in which human beings generate and consume information, to an Internet of Things (IoT) network, in which distributed components including things exchange and process information. Internet-of-Everything (IoE) technology is one example of a combination of big-data processing technology with IoT technology through connection via a cloud server.

To implement IoT, technical elements including sensing techniques, wired/wireless communication and network infrastructures, service interface techniques, and security techniques are required. Accordingly, technologies for sensor networks, Machine-to-Machine (M2M), and Machine-Type Communication (MTC) are being studied in order to connect things.

In an IoT environment, intelligent Internet Technology (IT) services may be provided which collect and analyze data generated from connected things to create new values for human life. The IoT may be applied to the areas of a smart home, a smart building, a smart city, a smart car or connected car, a smart grid, health care, smart home appliances, and advanced medical care services through combination and integration of existing IT technologies with diverse industries.

Accordingly, various attempts are made to apply a 5G communication system to an IoT network. For example, 5G communication technologies including sensor network, M2M, and MTC technologies are implemented by beamforming, MIMO, and array antenna techniques. Applying a cloud radio access network as a big-data processing technology is one example of a combination of 5G technology and IoT technology.

Meanwhile, smartphones are increasingly used, and users download various kinds of applications for use on smartphones. Downloaded applications include a variety of applications including an application operating with a screen off and an application using a great amount of radio data, and consume different levels of power during the same amount of operating time.

The battery power of a terminal is generally consumed in response to a user's intention. However, in some cases, the battery may be consumed regardless of the user's intention, according to a background operation, for example, an application or system update operation, backup and synchronization operations, indexing and media scanning operations, or an application activation operation caused by the occurrence of an event. That is, even though the user is not using the terminal, the terminal may consume a substantial amount of battery power when running a complicated operation, such as an application or system update operation.

Thus, it is necessary to conduct studies on methods for addressing unnecessary power consumption due to background operation not intended by a user and the resulting heat generation phenomenon.

SUMMARY

An embodiment of the present invention proposes a device and a method for controlling standby power of a mobile terminal.

Further, an embodiment of the present invention proposes a device and a method for controlling power consumed by a background operation of a mobile terminal.

In accordance with an embodiment of the present invention, there is proposed a method for controlling standby power of a mobile terminal, the method including: detecting an application and service related to a background operation, and classifying the detected application and service according to characteristics; predicting a use pattern of the application and service classified according to characteristics in view of a user response to the application and service classified according to characteristics; and controlling the application and service classified according to characteristics based on the application and service and the predicted use pattern.

In accordance with an embodiment of the present invention, there is proposed a device for controlling standby power of a mobile terminal, the device including: a classification unit that detects an application and service related to a background operation and classifies the detected application and service according to characteristics; a prediction unit that predicts a use pattern of the application and service classified according to characteristics in view of a user response to the application and service classified according to characteristics; and a controller that controls the application and service classified according to characteristics based on the application and service and the predicted use pattern.

Other aspects, gains, and core features of the present invention are processed with additional drawings, and they are apparent to those skilled in the art from the following detailed description including exemplary embodiments of the present invention.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular controller may be centralized or distributed, whether locally or remotely. Definitions for certain words and phrases are provided throughout this patent document, those skilled in the art should understand that in many, if not most instances, such definitions apply to prior, as well as future uses of such defined words and phrases.

The present invention solves the issue of power consumption that is not intended by a user and the resulting heat generation phenomenon, thereby increasing the total usage time of a terminal and preventing in advance a problem in which the user is not allowed to perform an operation when really needed due to a low battery.

DETAILED DESCRIPTION

Figure 1:
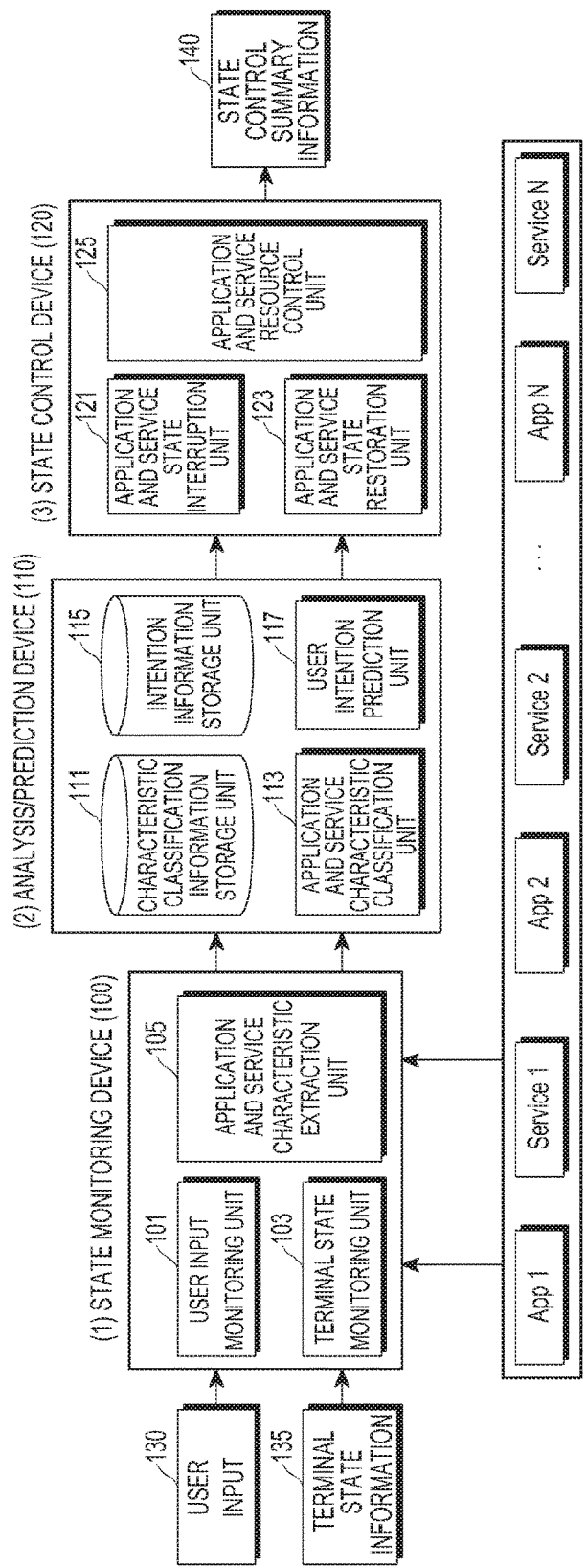
FIG. 1 illustrates an internal configuration of a user intention prediction device based on a user response to an application and service classified according to characteristics according to one embodiment of the present invention.

Hereinafter, exemplary embodiments of the present invention will be described in detail with reference to the accompanying drawings. Further, in the following description of the present invention, a detailed description of known functions and configurations incorporated herein will be omitted when it may make the subject matter of the present invention rather unclear. The terms which will be described below are terms defined in consideration of the functions in the present invention, and may be different according to users, intentions of the users, or customs. Therefore, the definitions of the terms should be made based on the contents throughout the specification.

The present invention may have various modifications and various embodiments, among which specific embodiments will now be described more fully with reference to the accompanying drawings. However, it should be understood that the present invention is not limited to the specific embodiments, but the present invention includes all modifications, equivalents, and alternatives within the spirit and the scope of the present invention.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present invention. As used herein, the term "and/or" includes any and all combinations of one or more associated items.

The terms used herein are used only to describe particular embodiments, and are not intended to limit the present invention. As used herein, the singular forms are intended to include the plural forms as well, unless the context clearly indicates otherwise. In the present invention, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present invention, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present invention, the electronic device may be a smart home appliance with a communication functionality. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present invention, the electronic device may be a medical appliance (e.g., magnetic resonance angiography (MRA) device, magnetic resonance imaging (MM) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present invention, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present invention, the electronic device may be a combination of the above-mentioned devices. Further, it will be apparent to those skilled in the art that the terminal according to various embodiments of the present invention is not limited to the above-mentioned devices.

A method for minimizing battery consumption that occurs by a background operation regardless of a user intention is described in detail in the following embodiments of the present invention. That is, a method of classifying applications and services that consume battery power according to characteristics, predicting a user intention based on user responses to the applications and services classified according to characteristics, and controlling application and service operations based on predicted information is described in detail.

In the following embodiments of the present invention, the background operation is, for example, an application or system update operation, backup and synchronization operations, indexing and media scanning operations, and an application activation operation caused by the occurrence of an event. However, in addition to the aforementioned operations, the background operation may include any operations that operate regardless of a user intention and consume battery power without being displayed on a screen.

FIG. 1 illustrates an internal configuration of a user intention prediction device based on a user response to an application and service classified according to characteristics according to one embodiment of the present invention.

Referring to FIG. 1, the illustrated user intention prediction device includes a state monitoring device 100, an analysis/prediction device 110, and a state control device 120. It is assumed that the user intention prediction device is included in a terminal, and that the terminal has N applications (Apps) installed therein and provides N respective services through the installed applications.

The state monitoring device 100 monitors a user input and the state of the terminal, and includes a user input monitoring unit 101, a terminal state monitoring unit 103, and an application and service characteristic extraction unit 105.

The analysis/prediction device 110 classifies the characteristics of applications and services and predicts a user intention, that is, an application and service use pattern of the user, on the basis of information collected by the state monitoring device 100. The analysis/prediction device 110 includes a characteristic classification information storage unit 111, an application and service characteristic classification unit 113, an intention information storage unit 115, and a user intention prediction unit 117.

The state control device 120 controls application and service states based on data determined by the analysis/prediction device 110, and includes an application and service state interruption unit 121, an application and service state restoration unit 123, and an application and service resource control unit 125.

The user input monitoring unit 101 monitors a user input 130 on an application installed in the terminal and a service provided by the terminal, for example, a selection of a specific value and a request to stop or operate a related application or service, or monitors the time taken from the time a specified event occurs to the time a user input is made. The terminal state monitoring unit 103 monitors terminal state information 135, for example, a temperature change of the terminal (whether the terminal generates heat) and the usage rate of an application installed in the terminal, or monitors whether the terminal is not currently used.

The application and service characteristic extraction unit 105 extracts a behavioral characteristic on an application installed in the terminal and a service provided by the terminal, and takes unique authorization information assigned to the behavioral characteristic. The behavioral characteristic may be, for example, access to a specified device and a load percentage in an operation, and the unique authorization information may be, for example, information related to package update, data deletion, and media data update.

The application and service characteristic classification unit 113 determines whether a related application and a related service consume battery power or generate heat based on a behavioral characteristic extracted by the application and service characteristic extraction unit 105, and classifies an application and service that consume battery power or generate heat. The characteristic classification information storage unit 111 stores characteristic information classified by the application and service characteristic classification unit 113, that is, information on an application and service that consume battery power or generate heat.

The user intention prediction unit 117 predicts a use pattern of a related application and a related service, that is, whether to stop the related application and service, to keep operating the related application and service, or to store state information before stopping the related application and service, based on a user response to the related application and service. The intention information storage unit 115 stores user intention information predicted by the user intention prediction unit 117.

The application and service state interruption unit 121 and the application and service state restoration unit 123 operate based on a result predicted by the user intention prediction unit 117. That is, when the user intention prediction unit 117 predicts the stoppage of the related application and service, the application and service state interruption unit 121 stops all tasks on the related application and service. When the user intention prediction unit 117 predicts that state information is to be stored before stopping the related application and service, the application and service state restoration unit 123 stores state information for an application and service of which state classifications are uncertain and restores the application and service in response to a user selection.

The application and service resource control unit 125 controls access to a specified device and/or resource related to an application and service, and outputs state control summary information 140.

Figure 2:
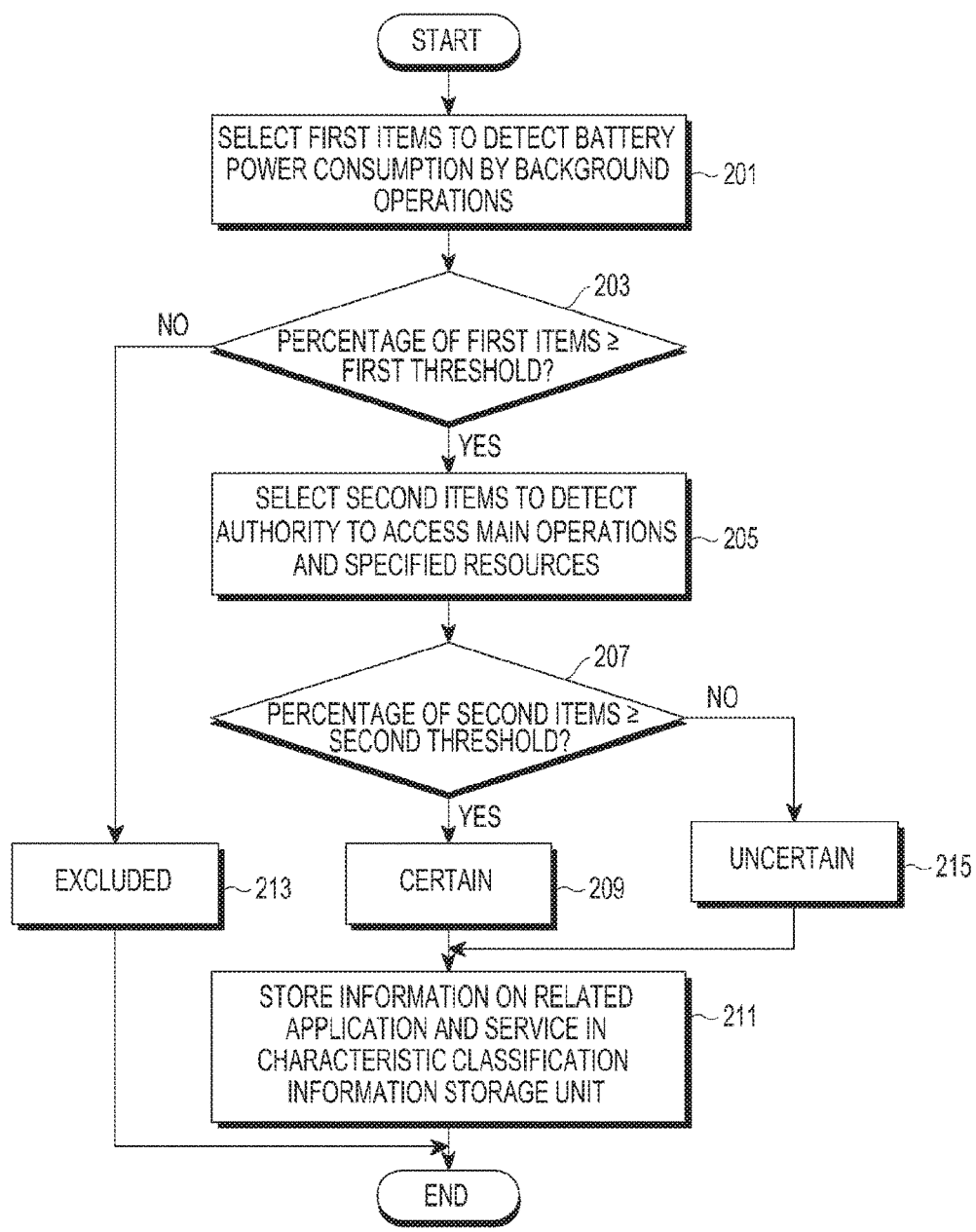
FIG. 2 is a flowchart illustrating an example of an operation in which an application and service characteristic classification unit included in an analysis/prediction device performs characteristic classification.

FIG. 2 is a flowchart illustrating an example of an operation in which the application and service characteristic classification unit included in the analysis/prediction device performs characteristic classification.

Referring to FIG. 2, in operation 201, the application and service characteristic classification unit selects first items to detect battery power consumption by background operations and performs first classification. In operation 203, the application and service characteristic classification unit examines whether the percentage (%) of the first items selected in operation 201, which is calculated in view of similarity with respect to each of the first items, is a predetermined first threshold or greater.

As a result of examination in operation 203, when the percentage of the first items is less than the first threshold, the application and service characteristic classification unit classifies the background operations as 'excluded' in operation 213. When the percentage of the first items is the first threshold or greater, the application and service characteristic classification unit performs operation 205.

In operation 205, the application and service characteristic classification unit selects second items to detect authority to access main operations and specified resources, for example, video data, audio data, other applications, stored resources and network resources, with respect to the background operations and performs second classification. In operation 207, the application and service characteristic classification unit examines whether the percentage of the second items selected in operation 205, which is calculated in view of similarity with respect to each of the second items, is a predetermined second threshold or greater. Here, the percentage is calculated with respect to each of the background operations, for example, an update-related operation, a backup-related operation, an index-related operation, and an event-related operation, and each of the calculated percentages is compared with the second threshold.

As a result of examination in operation 207, when the percentage of the second items is less than the second threshold, the application and service characteristic classification unit classifies the background operations as 'uncertain' in operation 215. When the percentage of the second items is the second threshold or greater, the application and service characteristic classification unit classifies the background operations as 'certain' in operation 209. That is, the application and service characteristic classification unit classifies only an operation having a calculated percentage of the second threshold or greater as 'certain' among the update-related operation, the backup-related operation, the index-related operation, and the event-related operation.

In operation 211, the application and service characteristic classification unit stores, in the characteristic classification information storage unit, information on an application and service related to an operation classified as 'certain,' the characteristic information ('certain') thereon, information on an application and service related to an operation classified as 'unclear,' and the characteristic information ('uncertain') thereon.

Below, the aforementioned first classification and second classification are described in detail with reference to Tables 1 and 2.

Although the present disclosure has been described with an exemplary embodiment, various changes and modifications may be suggested to one skilled in the art. It is intended that the present disclosure encompass such changes and modifications as fall within the scope of the appended claims.

TABLE 1

| Item | Reference score | Calculated score |
| --- | --- | --- |
| Is it possible to use resources in background state? | 30 | 20 |
| Does resource usage meet or exceed a certain level of resources? | 40 | 30 |
| Is startup automatic? | 30 | 20 |
| Percentage | | 70 |

Table 1 illustrates the reference scores and actually calculated scores of the respective first items assuming that the selected first items are as follows: 1) Is it possible to use resources in background state? 2) Does resource usage meet or exceed a certain level of resources? 3) Is startup automatic? In Table 1, the calculated scores are calculated based on the reference scores assigned to the respective items and similarity with respect to the respective items, and the percentage of the first items is calculated as the sum of the calculated scores of the respective items.

Here, if the predetermined first threshold is 50, the percentage (70) of the first items is greater than the first threshold (50), and thus second classification is performed.

TABLE 2

| Item | Reference score | Update-related | Backup-related | Index-related | Event-related |
| --- | --- | --- | --- | --- | --- |
| Is there authority over package management? | 25 | 20 | 0 | 0 | 10 |
| Is it possible to access media data? | 25 | 20 | 0 | 20 | 0 |
| Is it possible to access a storage unit and a network? | 30 | 20 | 10 | 0 | 0 |
| Is there authority to control a specified resource? | 25 | 0 | 20 | 0 | 0 |
| Percentage | | 60 | 30 | 20 | 10 |

Table 2 shows the reference scores and the actually calculated scores of the respective second items with respect to the predetermined background operations, that is, the update-related operation, the backup-related operation, the index-related operation, and the event-related operation, assuming that the selected second items are as follows: 1) Is there authority over package management? 2) Is it possible to access media data? 3) Is it possible to access a storage unit and a network? 4) Is there authority to control a specified resource? Here, the specified resource considered in the fourth item among the second items includes, for example, a frequency resource related to Central Processing Unit (CPU) usage and a screen.

In Table 2, the calculated scores of the respective items with respect to each of the update-related operation, the backup-related operation, the index-related operation, and the event-related operation are calculated based on the reference scores assigned to the respective items and similarity with respect to the respective items. Further, the percentage of the second items is calculated as the sum of the calculated scores of the respective items with respect to each of the update-related operation, the backup-related operation, the index-related operation, and the event-related operation.

Here, if the predetermined second threshold is 60, the update-related operation corresponding to a percentage of 60 or greater is classified as 'certain,' and the backup-related operation, the index-related operation and the event-related operation which correspond to a percentage of less than 60 are classified as 'uncertain.'

Figure 3:
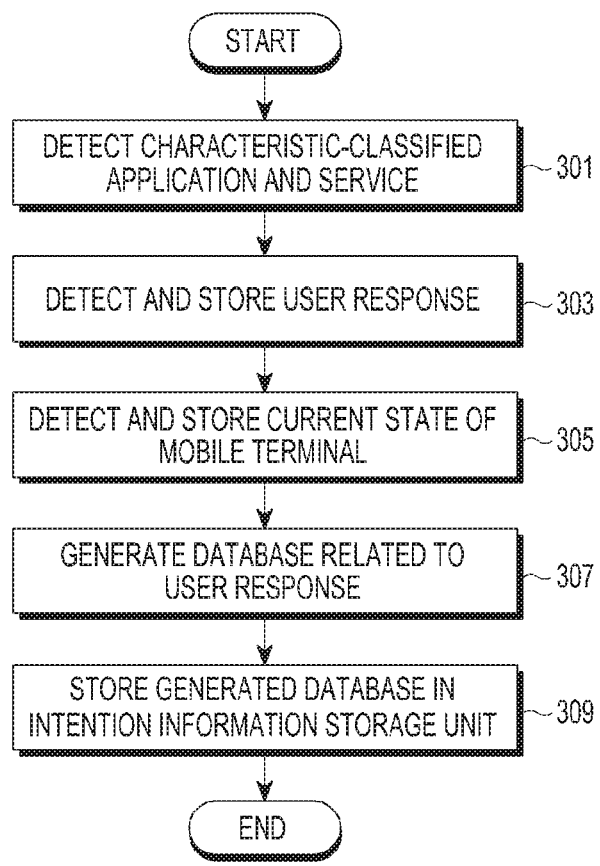
FIG. 3 is a flowchart illustrating an example of an operation in which a user intention prediction unit included in the analysis/prediction device predicts a user intention using real-time information.

FIG. 3 is a flowchart illustrating an example of an operation in which the user intention prediction unit included in the analysis/prediction device predicts a user intention using real-time information.

Referring to FIG. 3, in operation 301, the user intention prediction unit detects a characteristic-classified application and service, that is, an application and service indicated by information stored in the characteristic classification information storage unit.

In operation 303, the user intention prediction unit detects and stores a user response to the detected application and service, for example, the time taken from the time a specified event occurs pertaining to the application and service to the time a user response, for example, a user input, is received. Further, in operation 305, the user intention prediction unit detects and stores the current state of a mobile terminal, for example, a network connection status, whether a battery is charging, an available battery level, and the current time. Here, although operation 303 is described as being followed by operation 305 by way of example, operation 303 may follow operation 305 as necessary.

In operation 307, the user intention prediction unit generates a user intention database, that is, a database related to a user response to the current state of the mobile terminal. In operation 309, the user intention prediction unit stores the generated user intention database in the intention information storage unit.

Hereinafter, a user intention database with respect to each of the background operations is described in detail with reference to Table 3. The user intention database illustrated in Table 3 is generated by the current state of the mobile terminal, wherein the current state of the mobile terminal may be, for example, the case where the available battery level is 50% or less, the case where the mobile terminal is connected to a Wireless Fidelity (Wi-Fi) network, the case where the mobile terminal is connected to a Long-Term Evolution (LTE) network, the case where the battery is charging, and the case where the current time is the early morning.

TABLE 3

| Item | Reference score | Update-related | Backup-related | Index-related | Event-related |
| --- | --- | --- | --- | --- | --- |
| Automatic-start | 25 | 20 | 10 | 10 | 10 |
| User-stopping rate | 25 | 25 | 20 | 0 | 0 |
| User-stopping rate at reoperation | 30 | 30 | 10 | 0 | 0 |
| User response time to occurrence of event | 25 | 15 | 10 | 10 | 0 |
| Percentage | | 90 (stopped) | 50 (resource restricted) | 20 (operating) | 10 (operating) |

Table 3 shows user response-related information on each of an update-related operation, a backup-related operation, an index-related operation, and an event-related operation assuming that background operations are classified into the update-related operation, the backup-related operation, the index-related operation, and the event-related operation and that the current state of the mobile terminal corresponds to an available battery level of 50% or less. Further, assuming that items considered as the user response-related information are as follows: 1) Automatic start, 2) User-stopping rate, 3) User-stopping rate at reoperation, and 4) User response time to occurrence of event, Table 3 shows the reference scores and the actually calculated scores of the respective items with respect to the update-related operation, the backup-related operation, the index-related operation, and the event-related operation.

In Table 3, the calculated scores of the respective items with respect to each of the update-related operation, the backup-related operation, the index-related operation, and the event-related operation are calculated based on the reference scores assigned to the respective items and similarity with respect to the respective items. The calculated scores are updated as a user response occurs. Further, a percentage with respect to each of the update-related operation, the backup-related operation, the index-related operation, and the event-related operation is calculated as the sum of the calculated scores of the respective items. The percentage is used to subsequently determine whether to stop or keep operating a related application and service or whether to restrict resources used in an operation. Here, restricting resources means restricting CPU usage, input/output, a connected network, and storage capacity.

For example, assuming that a first reference value used to determine whether to stop the related application and service is 60 and a second reference value used to determine whether to keep operating the related application and service is 30, the percentage (90) of the update-related operation is greater than the first reference value (60), and thus it is determined to stop an application and service related to the update-related operation. Since the percentage (50) of the backup-related operation is less than the first reference value (60) and is greater than the second reference value (30), it is determined to restrict resources used in the operation of an application and service related to the backup-related operation. Since the percentage (20) of the index-related operation and the percentage (10) of the event-related operation are less than the second reference value (30), it is determined to keep operating applications and services related to the index-related operation and the event-related operation.

Figure 4:
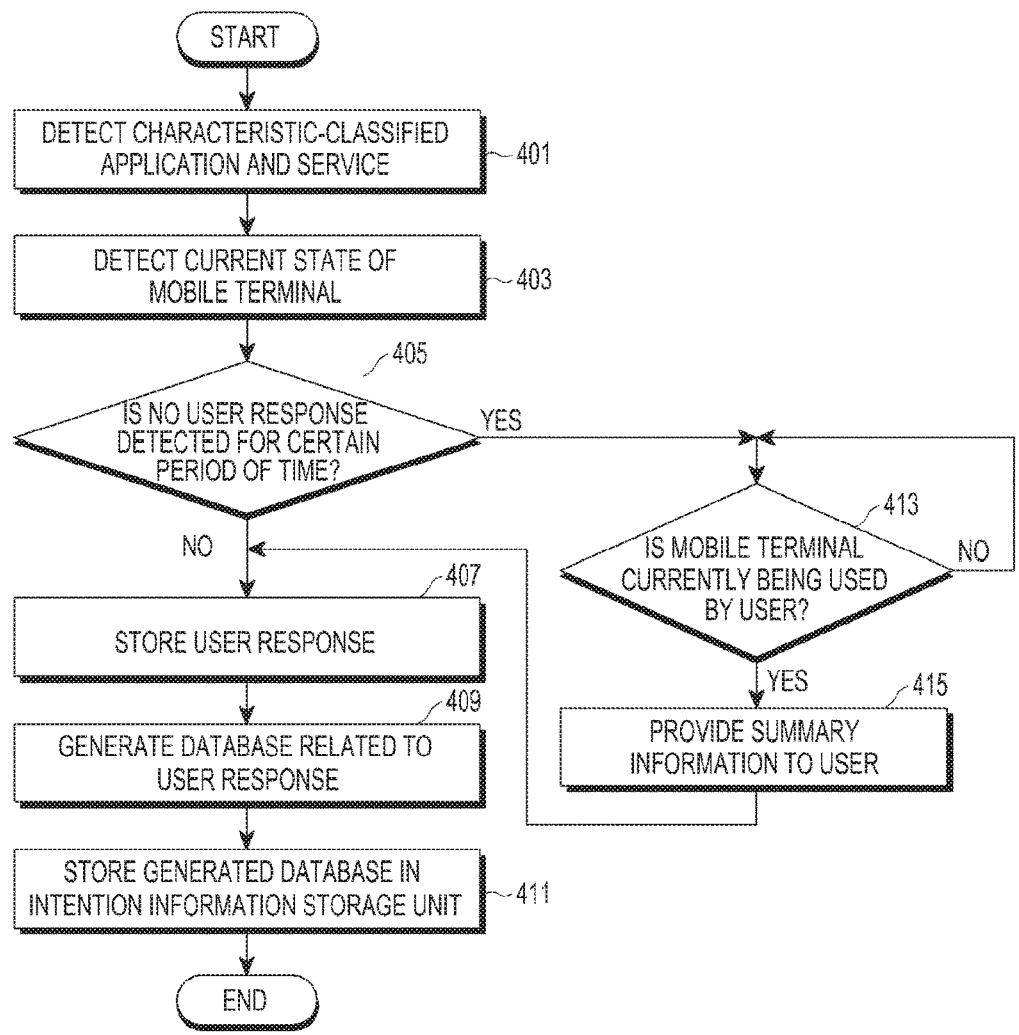
FIG. 4 is a flowchart illustrating an example of an operation in which the user intention prediction unit included in the analysis/prediction device predicts a user intention using delayed information.

FIG. 4 is a flowchart illustrating an example of an operation in which the user intention prediction unit included in the analysis/prediction device predicts a user intention using delayed information.

Referring to FIG. 4, in operation 401, the user intention prediction unit detects a characteristic-classified application and service, that is, an application and service indicated by information stored in the characteristic classification information storage unit.

In operation 403, the user intention prediction unit detects the current state of a mobile terminal, for example, a network connection status, whether a battery is charging, and an available battery level.

In operation 405, the user intention prediction unit examines whether a user response to the application and service detected in operation 401 is not detected for a certain period of time. Here, the user response may be, for example, the time taken from the time a specified event occurs pertaining to the application and service to the time the user response is made. The user response may not be detected for the certain period time when a user does not use the mobile terminal for a long time, for example, due to sleeping, attending a conference, or watching a movie.

As a result of examination in operation 405, when no user response is detected for the certain period of time, the user intention prediction unit examines whether the mobile terminal is currently being used by the user in operation 413. Here, the examination operation of operation 413 is repeated until the use of the mobile terminal is detected. As a result of examination in operation 413, when the use of the mobile terminal is detected, that is, when the mobile terminal is currently being used by the user, the user intention prediction unit provides summary information to the user in operation 415. The summary information will be described below in more detail with reference to FIG. 5, and thus a description thereof is omitted herein.

Subsequently, the user intention prediction unit stores a user response to the summary information in operation 407. In operation 409, the user intention prediction unit generates a user intention database, that is, a database related to a user response to the current state of the mobile terminal. In operation 411, the user intention prediction unit stores the generated user intention database in the intention information storage unit.

Meanwhile, when the user response to the application and service detected in operation 401 is detected within the certain period of time in operation 405, the user intention prediction unit stores the user response in operation 407.

Figure 5:
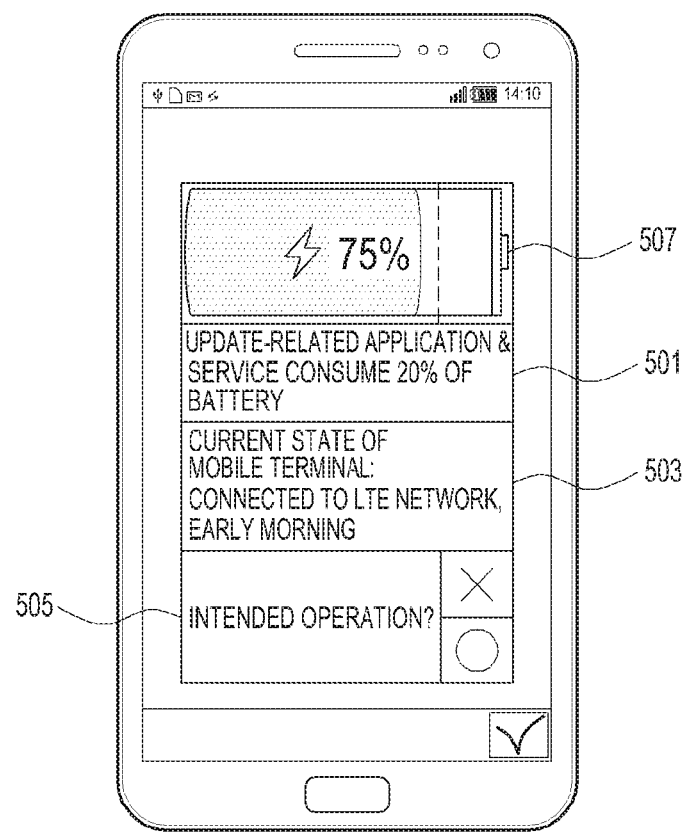
FIG. 5 illustrates an example of summary information provided to a user when no user response is detected for a certain period of time.

FIG. 5 illustrates an example of a user interface on summary information provided to the user when no user response is detected for a certain period of time.

Referring to FIG. 5, when a user response to an application and service is not detected for a certain period of time, the user intention prediction unit detects an amount of battery power consumed for the operation of the characteristic-classified application and service and whether heat is generated in the operation, and provides illustrated summary information to the user when the mobile terminal is used by the user after the certain period of time.

The illustrated summary information includes information indicating a current battery level, information related to battery consumption, and information indicating the current state of the mobile terminal. That is, reference number 507 shows that the available battery level of the mobile terminal is 75%; reference number 501 shows that an update-related application and service consume 20% of the battery of the mobile terminal; and reference number 503 shows the current state of the mobile terminal, in that the mobile terminal is connected to an LTE network and the current time is early in the morning. Reference number 505 is for identifying whether the update-related application and service are an operation intended by the user, in which the user may respond by expressing the user's intention using 'O' and 'X'.

The summary information may be used to control the related application and service according to a user response when the same operation, that is, the update-related application and service, occurs upon receiving the user response. That is, when the user express the user's intention by inputting 'X', representing that the update-related application and service are not an intended operation, the update-related application and service are controlled not to operate when the current state of the mobile terminal indicates that the mobile terminal is connected to the network and indicates the early morning time.

Figure 6:
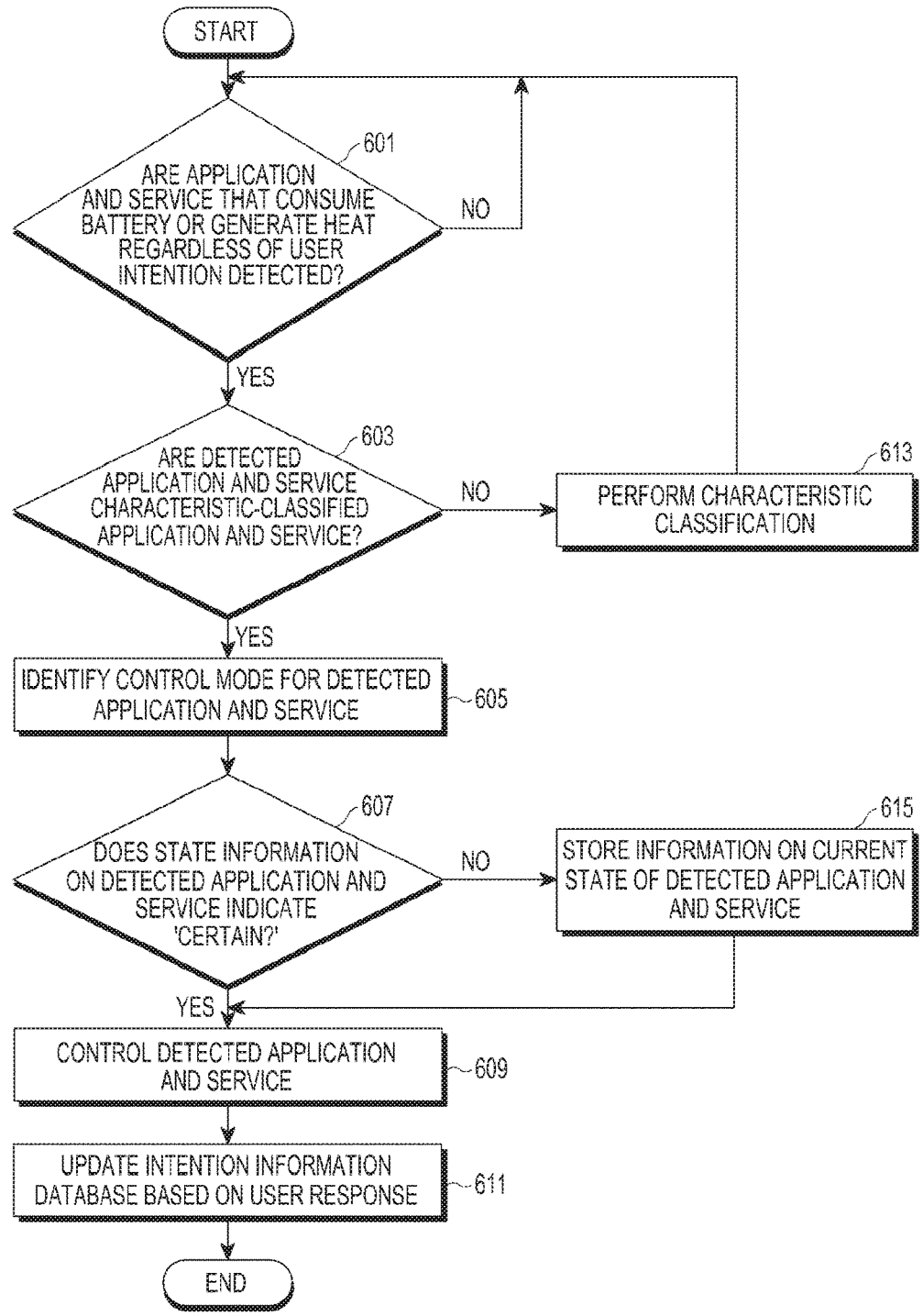
FIG. 6 is a flowchart illustrating an example of an operation in which a state control device controls a related application and service based on information from the analysis/prediction device.

FIG. 6 is a flowchart illustrating an example of an operation in which the state control device controls a related application and service based on information from the analysis/prediction device.

Referring to FIG. 6, when an application and service that consume battery power or generate heat regardless of a user intention are detected among applications and services related to background operations in operation 601, the state control device examines whether the detected application and service are a characteristic-classified application and service in operation 603. Here, the characteristic-classified application and service refer to an application and service stored in the characteristic classification information storage unit.

As a result of examination in operation 603, when the detected application and service are a characteristic-classified application and service, the state control device performs operation 605. When the detected application and service are not a characteristic-classified application and service, the state control device performs characteristic classification in operation 613. An operation of performing the characteristic classification has been described in detail with reference to FIG. 2, and thus a description thereof is omitted herein.

In operation 605, the state control device identifies a control mode for the detected application and service based on an intention information database stored in the intention information storage unit.

In operation 607, the state control device examines whether characteristic information on the detected application and service indicates 'certain' based on a database stored in the characteristic classification information storage unit. As a result of examination in operation 607, when the characteristic information on the detected application and service indicates 'certain,' the state control device controls the detected application and service in operation 609. That is, the state control device controls the detected application and service according to the intention information database.

Subsequently, in operation 611, the state control device updates the intention information database stored in the intention information storage unit based on a user response according to real-time information or delayed information.

As a result of examination in operation 607, when the characteristic information on the detected application and service indicates 'uncertain,' the state control device stores information on the current state of the detected application and service in operation 615.

Hereinafter, the operation of controlling the application and service according to the intention information database in operation 609 is described in more detail with reference to Table 4.

TABLE 4

| Intention information database | Control operation | |
|---|---|---|
| Operate | Keep operating application and service | |
| Stop | Stop application and service | |
| Restrict Resource | Frequent network access | Control access to network resource |
| | Occupancy of CPU to certain level or greater | Control scheduling period of application and service |
| | Forcible control of specified resource (screen on) | Control screen not to be on or control brightness when screen is on |

In Table 4, the intention information database is classified into three categories, that is, Operate, Stop, and Restrict Resource. In the intention information database, 'Operate' indicates continuing to operate an application and service, and 'Stop' indicates stopping an application and service. Meanwhile, as a result of examination in operation 607, when the characteristic information on the detected application and service indicates 'uncertain', 'Stop' in the intention information database indicates stopping the application and service and restoration information in the state of 'uncertain' is stored.

Further, 'Restrict Resource' indicates controlling a network resource, a scheduling period and the screen of a mobile terminal. In the case of frequent network access, access to a network resource is controlled. In the occupancy of the CPU to a certain level or greater, the scheduling period of an application and service is controlled. In need of forcible control of a specified resource, for example, a screen-on, the screen is controlled not to be on or the brightness is adjusted when the screen is on. Controlling access to the network resource may be, for example, an operation of collecting operations of a messaging application during a certain period of time and processing the operations all at once.

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

It will be understood that a method and apparatus for controlling standby power of a mobile terminal according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. A web widget manufacturing method of the present invention can be realized by a computer or a portable terminal including a controller and a memory, and it can be seen that the memory corresponds to an example of the storage medium which is suitable for storing a program or programs including instructions by which the embodiments of the present invention are realized, and is machine readable.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, in embodiments of the present invention, the program may be received from the apparatus for controlling standby power of a mobile terminal according to an embodiment of the present invention and may be stored. The program supply apparatus may include a program that includes instructions to execute the exemplary embodiments of the present invention, a memory that stores information or the like required for the exemplary embodiments of the present invention, a communication unit that conducts wired or wireless communication with the electronic apparatus, and a control unit that transmits a corresponding program to a transmission/reception apparatus in response to the request from the electronic apparatus or automatically.

The invention claimed is:

1. A method for controlling standby power of a mobile terminal, the method comprising:
   detecting an application and a service related to a background operation, and classifying the detected application and service according to characteristics;
   predicting a use pattern of the application and service classified according to the characteristics in view of a user response to the application and service classified according to the characteristics; and
   controlling the application and service classified according to the characteristics based on the predicted use pattern and the application and service classified according to the characteristics,
   wherein the user response comprises information on a time interval from a first time to a second time, the first time being a time when a specified event for the application and service occurs, the second time being a time when a user input is received.

2. The method as claimed in claim 1, wherein the classifying of the detected application and service according to characteristics comprises:
   selecting items for detecting an authority to access an operation and a specified resource with respect to the detected application and service;
   comparing a percentage, which is a sum of calculated scores of the selected items in view of similarity, with a predetermined threshold;
   classifying a characteristic of the detected application and service as certain when the percentage is the predetermined threshold or greater; and
   classifying the characteristic of the detected application and service as uncertain when the percentage is less than the predetermined threshold.

3. The method as claimed in claim 2, wherein the controlling of the application and service classified according to characteristics comprises:
   identifying a control mode for the application and service classified according to the characteristics based on the predicted use pattern; and
   controlling the application and service classified according to the characteristics based on the identified control mode when the characteristic of the detected application and service is classified as certain.

4. The method as claimed in claim 3, wherein the identified control mode is one of a first mode of continuing to operate the application and service classified according to the characteristics, a second mode of stopping the application and service classified according to the characteristics, and a third mode of restricting a resource used in operating the application and service classified according to the characteristics.

5. The method as claimed in claim 4, wherein the third mode is a mode of restricting at least one of access to a network resource, a scheduling period of a related application and service, or a configuration related to a screen-on.

6. The method as claimed in claim 2, further comprising providing a user with information related to a current state of the application and service classified according to the characteristics, when the characteristic of the detected application and service is classified as uncertain.

7. The method as claimed in claim 1, wherein the use pattern is predicted further in view of a current state of the mobile terminal, and the current state of the mobile terminal is determined based on at least one of a network connection state of the mobile terminal, whether the mobile terminal is charging a battery, an available battery level of the mobile terminal, or a current time.

8. The method as claimed in claim 1, further comprising:
providing preconfigured summary information when the user response is not detected for a certain period of time, and
predicting the use pattern based on a user response to the summary information, and a current state of the mobile terminal.

9. The method as claimed in claim 8, wherein the preconfigured summary information comprises at least one of information indicating an amount of battery power consumed by a related application and service, information indicating the current state of the mobile terminal, or information for receiving user intention information on the related application and service.

10. A device for controlling standby power of a mobile terminal, the device comprising:
at least one processor configured to:
detect an application and service related to a background operation and classifies the detected application and service according to characteristics,
predict a use pattern of the application and service classified according to the characteristics in view of a user response to the application and service classified according to the characteristics, and
control the application and service classified according to the characteristics based on the predicted use pattern and the application and service classified according to the characteristics,
wherein the user response comprises information on a time interval from a first time to a second time, the first time being a time when a specified event for the application and service occurs, the second time being a time when a user input is received.

11. The device as claimed in claim 10, wherein the at least one processor further configured to:

select items for detecting an authority to access an operation and a specified resource with respect to the detected application and service,
compare a percentage, which is a sum of calculated scores of the selected items in view of similarity, with a predetermined threshold,
classify a characteristic of the detected application and service as certain when the percentage is the predetermined threshold or greater, and
classify the characteristic of the detected application and service as uncertain when the percentage is less than the predetermined threshold.

12. The device as claimed in claim 11, wherein the at least one processor further configured to:
identify a control mode for the application and service classified according to the characteristics based on the predicted use pattern; and
control the application and service classified according to the characteristics based on the identified control mode when the characteristic of the detected application and service is classified as certain.

13. The device as claimed in claim 12, wherein the identified control mode is one of a first mode of continuing to operate the application and service classified according to the characteristics, a second mode of stopping the application and service classified according to the characteristics, and a third mode of restricting a resource used in operating the application and service classified according to the characteristics.

14. The device as claimed in claim 13, wherein the third mode is a mode of restricting at least one of access to a network resource, a scheduling period of a related application and service, or a configuration related to a screen-on.

15. The device as claimed in claim 11, wherein the at least one processor further configured to:
provide a user with information related to a current state of the application and service classified according to the characteristics, when the characteristic of the detected application and service is classified as uncertain.

16. The device as claimed in claim 10, wherein the use pattern is predicted further in view of a current state of the mobile terminal, and the current state of the mobile terminal is determined based on at least one of a network connection state of the mobile terminal, whether the mobile terminal is charging a battery, an available battery level of the mobile terminal, or a current time.

17. The device as claimed in claim 10, wherein the at least one processor further configured to:
provide preconfigured summary information when the user response is not detected for a certain period of time, and predict the use pattern based on a user response to the summary information, and a current state of the mobile terminal.

18. The device as claimed in claim 17, wherein the preconfigured summary information comprises at least one of information indicating an amount of battery power consumed by a related application and service, information indicating the current state of the mobile terminal, or information for receiving user intention information on the related application and service.

* * * * *